United States Patent [19]
Green

[11] 3,820,275
[45] June 28, 1974

[54] TOY ROCKET MOTOR WITH PRESSURE-RESPONSIVE MEANS ACTIVATED BY PROPELLANT PRESSURE

[75] Inventor: Charles J. Green, Vashion Island, Wash.

[73] Assignee: Estes Industries, Inc., Penrose, Colo.

[22] Filed: Feb. 4, 1972

[21] Appl. No.: 223,452

[52] U.S. Cl. ............... 46/74 B, 46/74 C, 46/86 C, 60/200, 102/34.1, 102/34.4
[51] Int. Cl. ........................................... A63h 27/06
[58] Field of Search ...... 46/74 A, 74 B, 74 C, 86 A, 46/86 B, 86 C, 76 A; 60/200; 102/49.4, 34.4, 34.1

[56] References Cited
UNITED STATES PATENTS

| | | | |
|---|---|---|---|
| 3,510,980 | 5/1970 | Pippin | 46/74 R |
| 3,613,296 | 10/1971 | Green | 46/76 A |
| 3,664,056 | 5/1972 | Stanzel | 46/74 A |

*Primary Examiner*—F. Barry Shay
*Attorney, Agent, or Firm*—Kenway & Jenney

[57] ABSTRACT

A toy rocket has a motor receptacle designed to receive a rocket motor of the type fueled by a self-pressurizing liquid propellant. The rocket motor during the fueling operation has its nozzle seated in a launcher through which liquid propellant flows into the propellant cavity of the rocket motor. When the propellant cavity of the rocket motor is pressurized, a member in the motor, responsive to propellant pressure in the rocket motor, extends through an aperture in the motor wall and engages a portion of the walls of the motor receptacle. When the pressure responsive member releases the receptacle walls, relative motion is provided between at least a portion of the rocket body and the rocket motor. In one embodiment a second stage portion of the rocket is spring-biased away from a first stage portion of the rocket body. The major section of the rocket motor is fixed to the first stage portion. The pressure responsive member on the rocket motor engages the second stage portion while the propellant maintains pressure to prevent separation of the first and second stages. When the propellant is expended, the pressure responsive member releases the second stage, allowing separation from the first stage. A parachute is then deployed from the second stage to brake the descent of the rocket.

A rocket launcher includes a seal for engaging the nozzle of the rocket motor, a fueling port and a releasable latch means for forcing the rocket nozzle onto the seal of the launcher to prevent loss of propellant.

13 Claims, 10 Drawing Figures

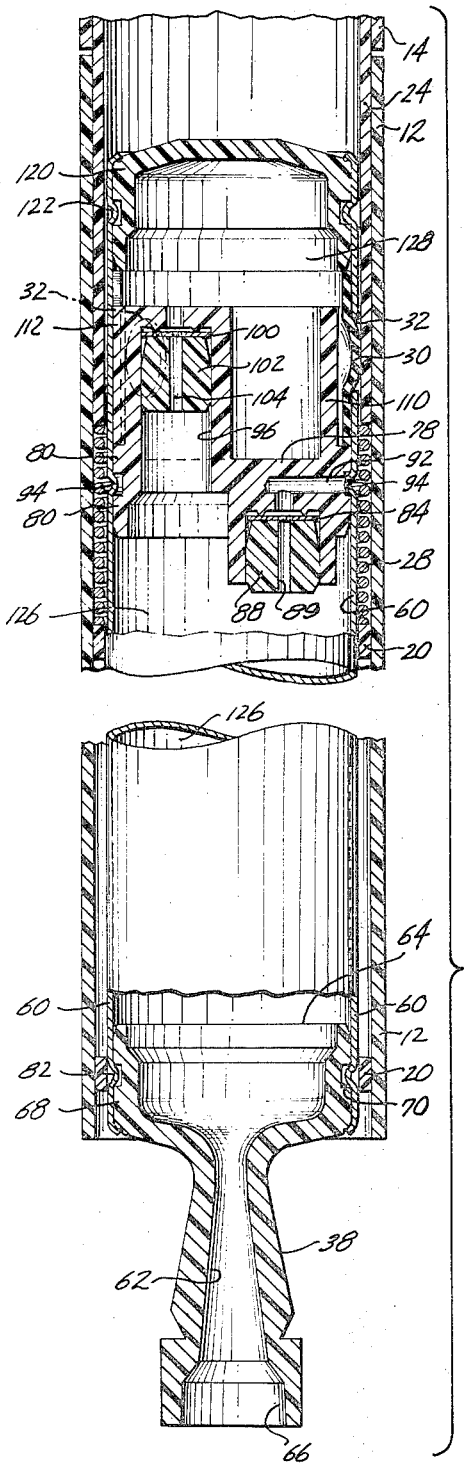
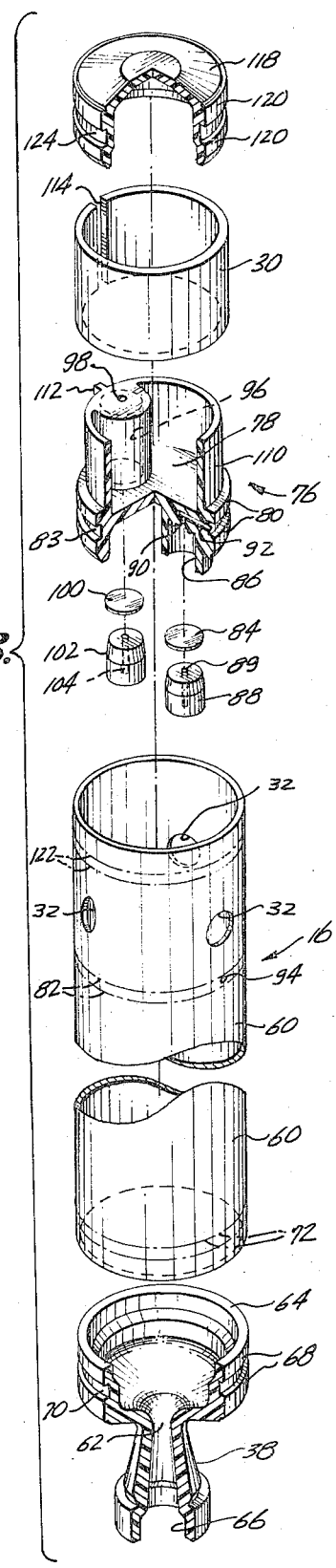
Fig. 2.
Fig. 3.

3,820,275

TOY ROCKET MOTOR WITH PRESSURE-RESPONSIVE MEANS ACTIVATED BY PROPELLANT PRESSURE

BACKGROUND OF THE INVENTION

The present invention relates to a toy rocket, a rocket motor therefor and a launch mechanism, and more particularly to a staged toy rocket, a rocket motor fueled by a self-pressurizing liquid, and a combined launcher fueling apparatus for the rocket motor.

Toy rockets propelled by a variety of fuels are well-known in the art. Many such toy rockets are capable of staging operations for example to release parachutes for descent braking. Most such toy rockets of the prior art, however, are relatively complex and expensive. In addition, many such rockets utilize fuels with which special precautions must be taken to ensure the safety of a person operating the rocket.

It is an object of the present invention to provide an inexpensive rocket motor which can be easily fabricated. It is a further object of the present invention to provide a rocket motor which uses a relatively safe, self-pressurizing, liquid propellant.

It is a still further object of the present invention to provide a staged rocket assembly which can be operated by the release mechanism of the rocket motor of the present invention. A related object is to provide a rocket assembly including a first and second stage which separates upon exhaustion of the propellant supply to deploy a descent braking means. It is another related object of the present invention to provide a rocket assembly to be utilized with the rocket motor of the present invention which alters the center of gravity of the rocket assembly upon exhaustion of the fuel supply to prevent an aerodynamic descent of the rocket assembly.

It is another object of the present invention to provide a rocket launcher and fueling mechanism for use with the rocket motor of the present invention. It is an object of the invention to provide a launcher which has a latch mechanism for retaining the rocket motor prior to launch. It is a further object of the invention to provide a gas and liquid seal between the launcher and the rocket motor. It is a related object to provide a seal between the rocket motor and the launcher which dispenses with accurate seating of the rocket motor in the launcher. It is a further object of the latch mechanism to ensure fluid tight seating of the rocket motor on the seal.

It is a further object of the rocket motor of the present invention to provide a release mechanism which engages at least a portion of the rocket body when the rocket motor is filled with propellant and to release the rocket body when the propellant is exhausted. It is a further object of the invention to provide a release mechanism which can be easily incorporated into a rocket motor and which can be fabricated inexpensively. It is a further object of the release mechanism to provide a time delay for release of the rocket body after the propellant in the rocket motor has been exhausted.

SUMMARY OF THE INVENTION

The above objects, and other objects which will be apparent to those of ordinary skill in the art upon reading the specification, are realized in a rocket motor comprising a body means defining a propellant cavity for receiving and holding a pressurized propellant fluid, said body means having at least one aperture extending through a peripheral wall thereof, nozzle means connected to the body and communicating with the cavity, pressure responsive means for protruding from said aperture, the pressure responsive means sealing the aperture and mounted for movement relative to the aperture and responsive to pressure changes in the cavity.

The invention also provides a rocket launcher comprising a body having a platform on the top thereof for receiving the end of the rocket nozzle, the body having a channel communicating between the exterior of the body and the surface of the platform, a resilient seal member having an opening therethrough, the seal member positioned on the platform, the opening aligned with the channel in the body, the opening also adapted to communicate with a rocket nozzle positioned on the platform, releasable latch means movably mounted in the body for retentively engaging a rocket nozzle in sealing engagement with the seal member, the latch means movable between a retention position and a release position.

The present invention also provides a toy rocket comprising a rocket body defining a motor receptacle, a rocket motor in the receptacle, the rocket motor including a body means defining a propellant cavity for receiving and holding a pressurized propellant fluid, the body means having at least one aperture extending through a peripheral wall thereof, nozzle means connected to the body and communicating with the cavity, pressure responsive means for protruding from the aperture, the pressure responsive means sealing the aperture and mounted for movement relative to the aperture and responsive to pressure changes in the propellant cavity, the pressure responsive means retentively engaging at least a portion of the rocket body when the propellant cavity is pressurized and releasing the portion of the rocket body when the cavity is depressurized to provide relative motion between the rocket motor and at least a portion of the rocket body.

BRIEF DESCRIPTION OF THE DRAWINGS

A better understanding of the present invention can be derived by reading the ensuing specification in conjunction with the accompanying drawings wherein:

FIG. 2 is a cross-sectional view of the rocket motor located in a rocket body illustrating the nozzle, the release mechanism and propellant cavity vent;

FIG. 3 is an exploded isometric view of the rocket motor;

FIG. 8 is a cross-sectional view of deployment of the second stage of a rocket after the release mechanism has retracted; and FIG. 9 is a view in partial cross section of an alternative embodiment of the present invention.

FIG. 10 is another partial cross section of the alternative embodiment of the invention shown in FIG. 9 but with the rocket motor shifted rearwardly from the position shown in FIG. 9.

DESCRIPTION OF PREFERRED EMBODIMENTS

Figure 1:
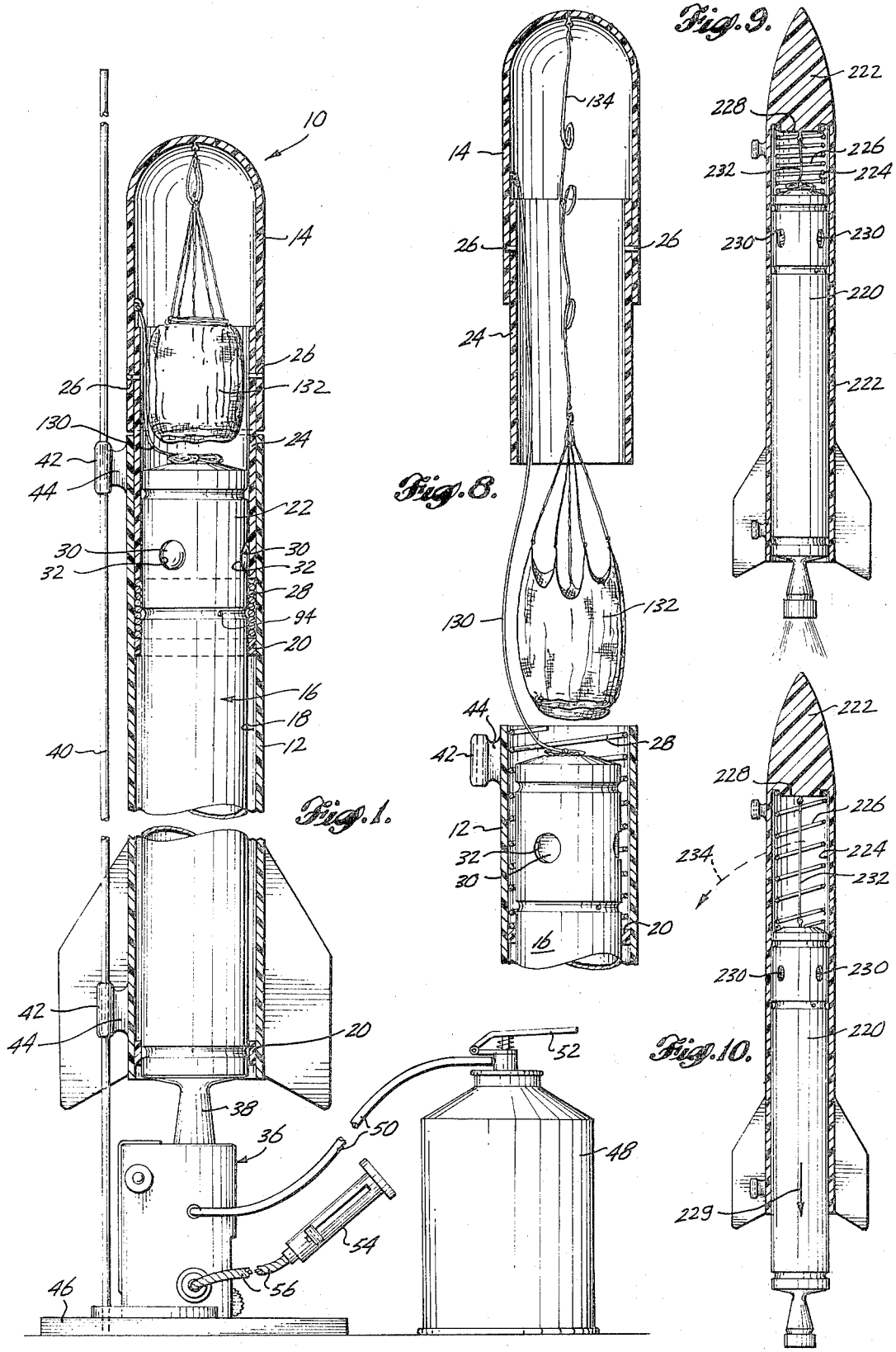
FIG. 1 is an elevation view in partial cross section of the rocket, rocket motor and launcher of the present invention in position for launch.

Referring to FIG. 1, the rocket, rocket motor and launcher of the present invention are shown in partial cross section poised for launch. The rocket, generally designated 10, includes a first stage portion 12 and a second stage portion 14. A rocket motor 16 is positioned within the motor receptacle 18 of the first stage 12. The rocket motor 16 is held in place by retaining rings 20 which provide an interfering fit between the outer wall of the rocket motor 16 and the inner walls of the motor receptacle 18. Thus the rocket motor 16 is spaced from the walls of the motor receptacle 18. The forward portion 22 of the rocket motor 16 is surrounded by a sleeve 24 which is connected by pins 26 to the second stage 14 of the rocket 10. The sleeve 24 slidably engages the annular space between the wall of the first stage 12 and the outer walls of the forward portion 22 of the rocket motor 16.

A coil spring 28, shown in compression, surrounds the rocket motor 16 and bears against the upper edge of upper retaining ring 20 and the bottom edge of sleeve 24. The coil spring 28 biases the second stage 14 away from the position shown. A pressure responsive member 30 described in detail later, protrudes through apertures 32 in the forward portion 22 of rocket motor 16 and bears against the inner walls of sleeve 24. Thus the coil spring 28 is prevented from separating the second stage 14 from the first stage 12.

The rocket 10 rests on a launcher mechanism 36, described in detail later, by engaging the nozzle 38 of rocket motor 16. The rocket 10 is vertically supported by launch wire 40, which slidably engages tubes 42 attached by brackets 44 by the outer walls of first stage 12. The launch wire 40 is supported in a base 46. The launcher 36 also rests upon base 46. A launcher release handle 54 is connected via bowden cable 56 to the launcher 36 for remote launch of the rocket 10.

Propellant is supplied to the rocket motor 16 from a propellant source 48 via tube 50. A fueling channel is provided in the launcher 36 which communicates with the nozzle 38 and thus with a propellant cavity in rocket motor 16. A preferred propellant for use with the rocket motor of the present invention is a volatile, self-pressurizing halogenated hydrocarbon which is a liquid at atmospheric temperatures and superatmospheric pressures. A suitable propellant is "Freon–12" sold by E.I. du Pont de Nemours and Company of Wilmington, Del. The propellant is supplied to the rocket motor 16 by depressing the valve lever 52 on the propellant source 48.

Now referring to FIGS. 2 and 3 jointly, a preferred form of the rocket motor 16 includes a body in the form of tube 60. Tube 60 has relatively thin walls and is elongate. For example, the tube 60 can be manufactured from drawn aluminum and have a nominal O.D. of 0.875 inch and a nominal I.D. of 0.84 inch. Typical yield pressures of such material are in the range of 39,000 psi. This is well above the stress levels generated by the propellant pressures normally encountered. The central portion of tube 60 is broken away; however, it is to be understood that the tube is preferably about 6 to 7 inches long.

A nozzle 38 has a venturi shaped channel 62 which communicates through its upper end 64 with the interior of tube 60. The shape of the lower portion 66 of the channel 62 will be described in detail in connection with the launch mechanism. The upper portion of the nozzle 38 has a circular exterior cross section. Shoulders 68 located thereon have an O.D. slightly larger than the I.D. of tube 60 to provide an interference fit between the shoulders 68 and the tube 60. A circumferential notch 70 is provided between shoulder 68 and is surrounded by the walls of tube 60 when the nozzle 38 is in place. After the nozzle is in place the tube 60 is deformed inwardly, as by rolling, into the notch 70 along the region indicated by the dotted lines 72. Thus an excellent fluid and mechanical seal is provded between the nozzle 38 and tube 60.

In the preferred embodiment the upper portion of tube 60 contains three equally spaced apertures 32 in the peripheral walls of the tube 60. A bulkhead assembly, generally designated 76, is positioned in the upper portion of tube 60. The bulkhead assembly includes a bulkhead 78 of generally cylindrical cross section. Shoulders 80 are provided on the bulkhead 78 which have an O.D. slightly greater than the I.D. of tube 60, thus providing an interference fit between the two when the bulkhead 78 is inserted into the tube 60. After the bulkhead 78 is inserted into the tube the outer wall of the tube 60 is deformed inwardly between dotted lines 82 into groove 83 to provide a gas tight seal between the outer portion of bulkhead 78 and the tube 60.

Prior to insertion of bulkhead 78 into tube 60 a paper disc 84 is inserted into a recess 86 in the rearward portion of the bulkhead 78. A retention plug 88 having a hole 89 therethrough is then inserted into recess 86 to hold the paper disc 84 tightly against the shoulder 90. A vent channel 91 communicates with the groove 83 of bulkhead 78 and with the hole 89. After the bulkhead 78 has been inserted into tube 60 and the tube walls have been deformed along lines 82, a vent port 94 is drilled in the wall of tube 60 to communicate with the vent channel 92 in the bulkhead 78.

A second recess 96 is provided in bulkhead 78. A port 98 communicates between recess 96 and the forward portion of the bulkhead 78. Of course the recess 96 communicates with the lower portion of the bulkhead 78. Prior to insertion of the bulkhead 78 into the tube 60 a second paper disc 100 is inserted into recess 96 and is retained tightly against the upper shoulder of recess 96 by retention plug 102. Channel 104 located in plug 102 provides fluid communication between the lower portions of the recess and port 98. The paper discs 84 and 100 are most preferably pervious to gas and substantially impervious to liquid. Suitable substitutes having these physical properites can be used if desired.

After the bulkhead 78 has been inserted in the tube 60, a strip 30 of relatively soft, flexible, resilient material is inserted into the annular space between the inner wall of tube 60 and the outer cylindrical sidewall 110 of bulkhead 78. The rubber strip 30 is preferably composed of an elastomeric material such as a styrene-butadiene rubber, for example a Buna-N rubber. A flange 112 protruding from wall 110 mates with a slit 114 in the strip 30 to prevent rotational movement of the strip 108 after assembly. The strip 30 is sized sufficiently large so that it will fit tightly against the inner walls of the tube 60. Thus the strip 30 will cover the apertures 32 in the tube 60.

After the rubber strip 30 has been inserted, an end cap 118 is inserted into the tube 60. The shoulders 120 of end cap 118 have an O.D. which is slightly greater than the I.D. of tube 60 to provide an interference fit between the end cap 118 and the tube 60. After insertion of end cap 118 the outer walls of the tube 60 are deformed inwardly between dotted lines 122 into the groove 124 to provide a fluid-tight seal between the tube 60 and the end cap 118.

In operation, propellant is introduced through channel 62 of rocket nozzle 38 into propellant cavity 126 within the tube 60. The cavity 126 is filled with liquid propellant. As it is being filled, gas slowly escapes through the hole 89 in retention plug 88, through paper disc 84, out vent channel 92 and through vent port 94. The vent mechanism allows the cavity 126 to be completely filled with liquid.

As the cavity 126 is being filled, gas also passes through hole 104 in retention plug 102, through paper disc 100, and through port 98 into bulkhead cavity 128. The gas pressure developed in bulkhead cavity 128 presses against the inner walls of rubber strip 30 effecting a fluid-tight seal over apertures 32. In addition, the portions of rubber strip 30 exposed through apertures 32 will deform from the gas pressure and will protrude through the apertures 32 as shown in FIG. 3. The pressure developed within bulkhead cavity 128 is sufficient to cause the rubber strip 30 to bear tightly against the inner walls of the sleeve 24. Sufficient frictional force is developed to prevent the sleeve 24 from separating from the first stage 12 of the rocket by action of spring 28.

After the propellant has been exhausted from the cavity 126, the gas in bulkhead cavity 128 begins to leak backwardly through paper disc 100 into the cavity 126, which is now under atmospheric pressure since the propellant is exhausted. When the pressure in bulkhead cavity 128 reduces to slightly above atmospheric pressure the rubber strip 30 exposed through apertures 32 will release the inner walls of the sleeve 24. The coil spring 28 then pushes the sleeve 24 from the first stage 12, thus separating the second stage 14 and the lower stage 12.

The staging action is shown in FIG. 8 where the second stage 14 is completely separated from the lower stage 12. A lanyard 130 ties the second stage 14 to the first stage 12. In addition, a storage cavity within the first stage 12 contains a deployable parachute 132 tied to the interior of second stage 14 by release rope 134.

The release mechanism contained within the bulkhead cavity of the rocket motor will retain the second stage on the first stage for a short period of time after the propellant is substantially exhausted from the propellant cavity 126 within the rocket motor 16. The time delay feature is provided by the slow leakage rate back out from bulkhead cavity 128 across paper disc 100 to the propellant cavity 126. As the rocket continues to rise upwardly for a short period of time after the propellant is exhausted, the second stage 14 will remain in place. However, as the rocket travels within proximity of its maximum altitude, the second stage 14 will be released to deploy parachute 132. The parachute 132, of course, serves to brake the descent of the rocket 10, thus preventing catastrophic damage to the rocket upon returning to the ground.

If no time delay release is desirable for a particular application, the disc 100 can be removed to provide restriction-free communication between the propellant cavity 126 and the bulkhead cavity 128.

Figure 4:
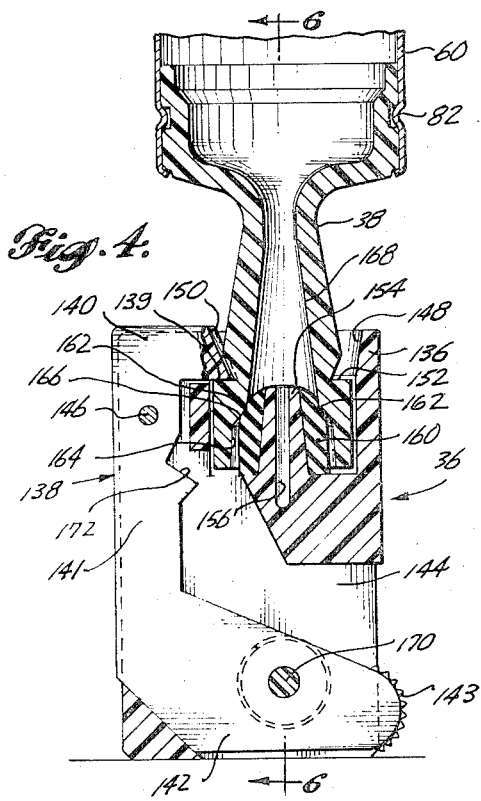
FIG. 4 is a cross-sectional view of the rocket launcher with rocket nozzle in place.
Figure 5:
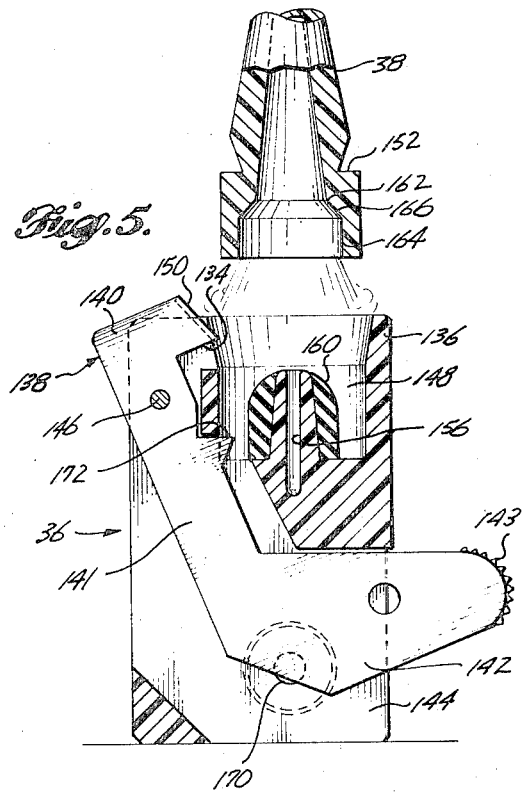
FIG. 5 is a cross-sectional view of the rocket launcher in the release position.
Figure 6:
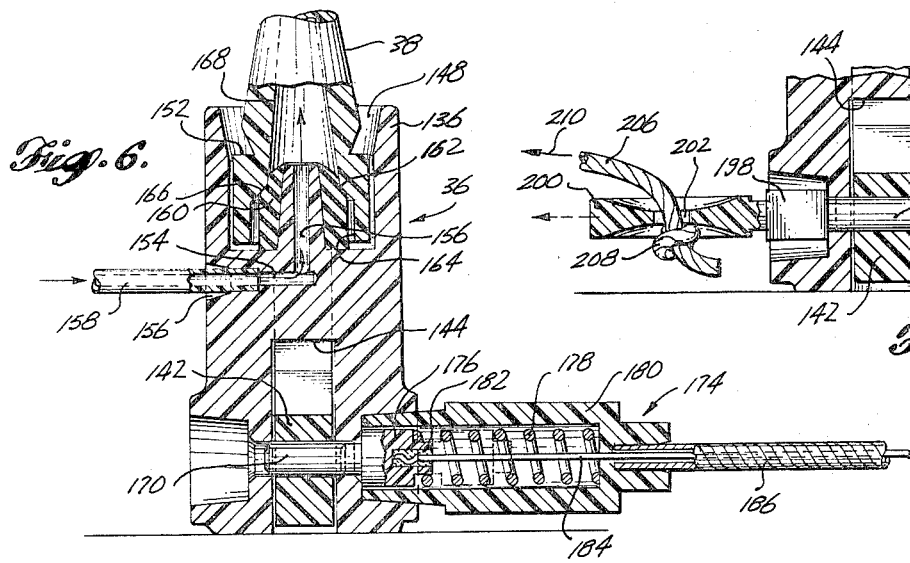
FIG. 6 is a cross-sectional view of the rocket launcher taken along a line similar to 6—6 of FIG. 4.

Referring now to FIGS. 4, 5 and 6, detailed crosssectional views of the launch mechanism 36 are illustrated. FIGS. 4 and 6 illustrate the launch assembly in its retention position and FIG. 5 illustrates the assembly in its release position. The launcher 36 includes a body portion 136 which can be molded in a single piece from a suitable thermoplastic or thermosetting polymer. A latch member 138 is positioned within a space 144 provided therefor in the body 136. The latch member 138 is mounted for pivotal movement within the body 136 by pivot pin 146. The upper portion of the body 136 contains a recess 148 opening to the outside of the body 136. Recess 148 is sized to receive a rocket nozzle 38, of for example the rocket motor of the present invention. The bottom surface of the recess 148 serves as a launch platform. The upper portion 139 of the latch member 138 has a tapered upper surface 150 which when contacted by the lower end of the nozzle assembly 38 will cause the latch member 138 to pivot from the position shown in FIG. 4 so that the recess 148 can accept the nozzle 38. When the nozzle 38 is in place, the upper portion 139 of the latch member 138 engages a shoulder 152 provided on the exterior of the nozzle 38.

The upper portion 139 of the latch member 138 is connected to outwardly extending portion 140. Portion 140 is in turn connected to downwardly extending portion 141. Pin 146 pivotally mounts the portion 141. Portion 142 of the latch member 138, connected to portion 141, extends inwardly under recess 148 and terminates in serrated end 143. The coaction of the various portions 139 through 143 of the latch member 138 provides positive seating of nozzle 38 on the seal member 160. An inward force applied by an operator's finger to the serrated portion 143 will be multiplied by latch 138 so that the nozzle 38 is forced downwardly onto seal 160.

A male member 154 extends upwardly from the bottom of recess 148. A channel 156 runs through the center of the male member 154 and communicates with a recess 156 in the side of the body 136. A fuel supply tube 158 is inserted in an interference fit into the recess 156. The rubber seal member 160 of annular cross section is fitted over the male member 154 in the recess 148. The top portion of the seal member 160 has a substantially spherical curvature which mates with the ring-like seat 162 in the opening of the nozzle 38. It will be noted that the nozzle has a wide port 164 of circular cross section which mates with an inwardly tapering section 166. Section 166 tapers inwardly to meet with the slightly inwardly tapering section of the nozzle port 168. The juncture of section 166 and 168 forms the ring-like seat 162. Since the top portion of the seal member 160 is spherically shaped and the ring-edge seat 162 is circular, the nozzle member will readily seat on the seal member 160 without precise alignment.

A latch pin 170 is inserted through an opening in the body 136 of the launcher 36 and mates with an opening in the bottom portion 142 of latch member 138. Latch pin 170 serves to retain the latch member 138 in its locked position, holding the nozzle 38 against seal member 160 during fueling and prior to launch. When it is desired to launch the rocket, the latch pin 170 is retracted from the opening in latch member 138. The upward thrust from nozzle 38 forces the latch member 138 to its open position as shown in FIG. 5. It will be noted that a small shoulder 172 forming a part of latch portion 141 protrudes into the recess 148 when the latch member 138 is in the open position. If the nozzle 38 becomes too firmly seated on the seal 160, the shoulder 172 will bear against the bottom edge of nozzle 38 forcing it upward and allowing thrust to develop from the nozzle 38.

Also shown in FIG. 6 is a remote latch pin release mechanism generally designated 174. Latch pin 170 has an annular shoulder 176 against which a coil spring 178 inside housing 180 bears. The rear portion 182 of latch pin 170 is connected to the wire 184 of a bowden cable 186. The wire 184 at its other end is connected to trigger member 188, which is mounted for sliding movement in channels 190 in the thumbpiece 192. As the trigger member 188 is pulled in the direction of arrow 194, the bowden wire 184 is also pulled in the same direction. Thus latch pin 170 moves out of registry with the opening in latch member 138 to release the latch member 138.

Figure 7:
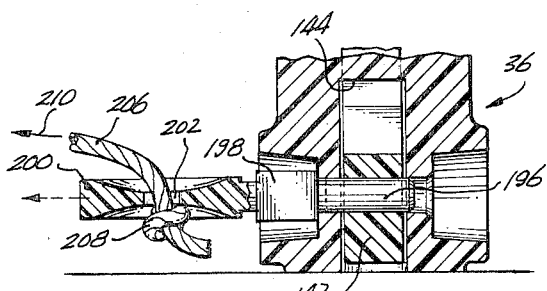
FIG. 7 is an alternative embodiment of the release pin for the launcher.

An alternate latch pin release mechanism is shown in FIG. 7. In this figure the latch pin 196 has an annular shoulder portion 198 which is in turn connected to an extended rear portion 200. Rear portion 200 contains an aperture 202 into which lanyard 206 is inserted. A knot 208 is tied in the lanyard to prevent separation from the aperture 202. As the lanyard is manually pulled backwardly in the direction of arrow 210, latch pin 196 disengages from the opening in latch member 138 to release the rocket nozzle.

Referring now to FIGS. 9 and 10, an alternate embodiment of the present invention is illustrated. In FIG. 9, a rocket motor 220 similar to that described above is slidably inserted within a cylindrical cavity 224 in rocket body 222. A coil spring 226 shown in compression bears against the forward wall 228 of the cavity 224 and against the forward end of the rocket motor 220. The rocket motor 220 is filled with propellant in the position shown in FIG. 9 so that the pressure responsive members 230 will engage the sidewalls of cylindrical cavity 224.

When the propellant in rocket motor 220 has been exhausted the pressure responsive members 230 will release the sidewalls of the cavity 224. Spring 226 will force the rocket motor 220 in the direction of arrow 229. A small lanyard 232 connected to the rocket 222 and to the motor 220 is provided to prevent complete separation of the rocket motor 220 from the body 222.

When the rocket motor 220 is in the position shown in FIG. 10, the center of gravity of the entire assembly has been shifted rearwardly far enough to prevent stable aerodynamic flight of the rocket 222. Thus, as the rocket begins its descent after the propellant has been exhausted, it will begin to tumble or roll, partially braking its descent. It has been found that in the rolling mode, a toy rocket will not be substantially damaged upon impact with the ground. If the rolling mode were not provided and the rocket allowed to aerodynamically descend, damage to the rocket and rocket engine would likely occur upon ground impact.

The present invention has been described in relation to a preferred embodiment and alternates thereto. Those of ordinary skill in the art will be able to effect various alterations, substitutions of equivalents and other changes without departing from the original concept of the invention. It is intended that the present invention be limited only by the definition contained in the appended claims.

What is claimed is:

1. A toy rocket motor comprising
    a body having a hollow interior, said body having means therein coacting with said hollow interior to define a propellent cavity for receiving and holding a pressurized propellent fluid, and also defining therewith a second cavity for receiving and holding a pressurizing gas, said body having means communicating between said second cavity and the body exterior including at least one aperture extending through a peripheral wall of said second cavity,
    a nozzle connected to said body and communicating between said propellent cavity and the exterior of said motor,
    pressure responsive means for sealing said communicating means and said second cavity when it is pressurized, said pressure responsive means comprising a member of flexible, resilient material disposed across said aperture on the inside of peripheral wall and being capable of extending through said aperture in response to pressure increases within said second cavity,
    said coacting means including a flow channel in fluid communication between said propellent cavity and said second cavity and
    means for restricting fluid passage through said flow channel, including a restriction member said restriction member being pervious to gas and substantially impervious to liquid.

2. The motor as set forth in claim 1 wherein said body is a tube which is sealed at one end and said coacting means is a bulkhead positioned within said tube to divide the interior of said tube into said propellent cavity and said second cavity, the flow channel communicating between said propellent cavity and said second cavity being located through said bulkhead.

3. The motor as set forth in claim 2 wherein said restriction member comprises paper which is pervious to gas and substantially impervious to liquid and which is maintained in said flow channel by a plug defining a hole which enables fluid communication between said paper and said propellent cavity.

4. The motor as set forth in claim 3 wherein said motor includes a vent in fluid communication between one of said cavities and the atmosphere.

5. The motor as set forth in claim 4 wherein said vent has a restriction member interposed therein, and wherein the vent enables fluid communication between said propellent cavity and the atmosphere.

6. The motor as set forth in claim 5 wherein said vent restriction member is a paper disc which is pervious to gas and substantially impervious to liquid.

7. The motor as set forth in claim 4 wherein said pressure responsive member comprises a strip of elastomeric material disposed over said aperture and contacting the interior side wall of said second cavity.

8. The motor as set forth in claim 7 wherein said vent comprises a second flow channel in fluid communication with said propellent cavity and the exterior of said body.

9. The motor as set forth in claim 8 wherein a piece of paper which is pervious to gas and substantially impervious to liquid is positioned in the flow path of said second flow channel.

10. The motor as set forth in claim 7 wherein said nozzle has a cylindrical body portion having an annular channel around the periphery thereof, and wherein said body has a circumferentially deformed portion mating with said annular channel to seal said nozzle to said body, said bulkhead having an annular channel around its periphery and engaging a continuously circumferentially deformed portion of said tube to seal said bulkhead to said tube.

11. The motor as set forth in claim 10 wherein said tube is formed of drawn aluminum.

12. The motor as set forth in claim 7 wherein said communicating means includes three equally spaced apertures are formed in said peripheral wall of said body defining said second cavity and wherein said strip is a single strip of rubber covering said apertures from the inside of the peripheral wall.

13. The motor as set forth in claim 12 wherein said strip of rubber is styrene-butadiene.

* * * * *